G. A. FITCH & G. A. CHAMBERLIN.
MILK PAIL HOLDER.
APPLICATION FILED MAY 26, 1909.

933,542.

Patented Sept. 7, 1909.

Witnesses:
J. Milton Jester
Richard Sommer

Inventor.
George A. Fitch
Guy A. Chamberlin
by Geyer & Popp
Attorney.

UNITED STATES PATENT OFFICE.

GEORGE A. FITCH AND GUY A. CHAMBERLIN, OF ELLICOTTVILLE, NEW YORK.

MILK-PAIL HOLDER.

933,542. Specification of Letters Patent. Patented Sept. 7, 1909.

Application filed May 26, 1909. Serial No. 498,506.

*To all whom it may concern:*

Be it known that we, GEORGE A. FITCH and GUY A. CHAMBERLIN, citizens of the United States, and residents of Ellicottville, in the county of Cattaraugus and State of New York, have invented a new and useful Improvement in Milk-Pail Holders, of which the following is a specification.

This invention relates to a milk pail holder whereby an attendant may conveniently support a pail on the knees during the operation of milking.

The object of this invention is to provide a holder of this character which is simple and durable in construction and which can be readily attached to and removed from the pail and adapted to pails varying in size.

Figure 1:
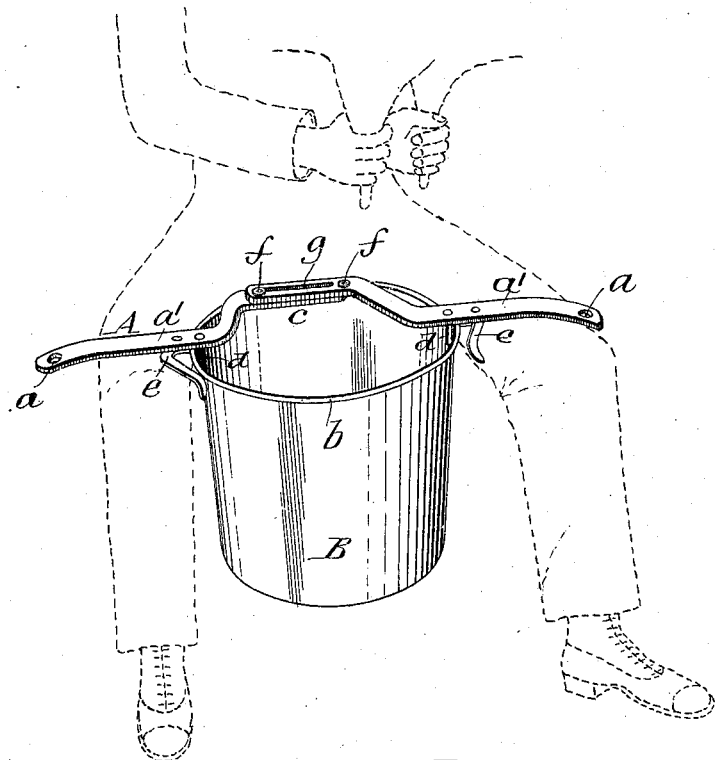
Figure 2:
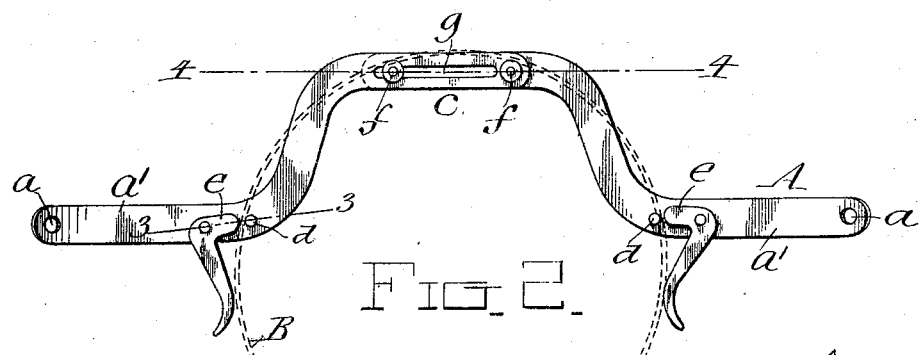
Figure 3:
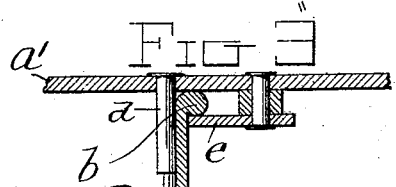
Figure 4:

In the accompanying drawings: Figure 1 is a perspective view of our improved milk pail holder, showing the same in use. Fig. 2 is a bottom plan view thereof, on an enlarged scale. Fig. 3 is a fragmentary vertical section, on an enlarged scale, in line 3—3, Fig. 2. Fig. 4 is a fragmentary vertical section, on an enlarged scale, in line 4—4, Fig. 2.

Similar letters of reference indicate corresponding parts throughout the several views.

In its general organization our improved milk pail holder comprises a supporting bar A which is adapted to rest at opposite ends on the knees of the attendant, and means whereby a milk pail B is detachably secured to a bar between its ends. The ends of the bar are preferably curved downwardly, as shown in Fig. 1, so that they do not slip off too readily from the knees while in use, and these ends are also provided with holes $a$ so that the same may be hung up on a nail or hook when not in use. The central part of the supporting bar is deflected or off-set to one side, preferably rearwardly, as shown at $c$, so that when a pail is secured to the bar between its ends preparatory to milking, the space above the top of the pail will be unobstructed and permit the milk to be directed into the pail without liability of striking the bar and becoming wasted. While in use the supporting bar rests on the upper edge of the pail at the rear and at opposite sides thereof, the rear part of the edge being engaged by the underside of the deflected central part of the supporting bar and the opposite side edges by the end parts of the bar which are lengthwise in line on opposite sides of the deflected central part, whereby a three point engagement is obtained on the bar for the pail.

The means for detachably securing the pail to the supporting bar comprise preferably two clamping pins or lugs $d$ depending from the end parts of the supporting bar and engaging preferably against the inner side of the pail, and two horizontally swinging clamping levers $e$ having preferably the form of cams and pivoted on the underside of the end parts of the bar, so that upon turning these levers inwardly the same engage with the outer side of the pail below the head $b$ thereof, as shown in Figs. 1 and 3, thereby clamping the pail between the pins and the levers and reliably connecting the same.

For the purpose of enabling the holder to be applied to pails varying in size or diameter, the bar is constructed in two sections $a^1$, $a^1$ which are adjustably connected so that the bar can be lengthened or shortened for bringing the clamping pins and levers into the proper position relatively to the opposite sides of the pail for engaging the same. The joint between the sections of the supporting bar is preferably located at the center of its rearwardly deflected part where the opposing inner ends of the bar sections overlap one another and the two sections are guided relatively to each other by means of a coupling rivet or pin $f$ arranged on each bar section and engaging with a longitudinal slot $g$ in the other section, whereby the sections may be slid lengthwise relatively to each other but are held against lateral displacement. The rivets are preferably sufficiently tight that the sections of the supporting bar are held in their adjusted position by friction thereby simplifying the construction and reducing the cost of the same accordingly.

Our improved milk pail holder contains but few parts, it is very convenient to use and can be produced at comparatively small cost rendering the same especially desirable for dairymen who have considerable milking to do and are subject to knee strain when holding pails for a long time between the legs in the ordinary way.

We claim as our invention:—

1. A milk pail holder comprising a supporting bar adapted to rest at its opposite ends on the knees of the attendant and having its central part deflected to one side, and means for detachably securing a pail to the bar between its ends.

2. A milk pail holder comprising a supporting bar adapted to rest at its opposite ends on the knees of the attendant and composed of two sections which are adjustable relatively to each other, and means for detachably securing a pail to said bar.

3. A milk pail holder comprising a supporting bar adapted to rest at its opposite ends on the knees of the attendant and composed of two sections which are adjustable relatively to each other, and means for detachably securing a pail to said bar consisting of a pin arranged on the inner part of each section and engaging with a longitudinal slot in the inner part of the other section.

4. A milk pail holder comprising a supporting bar adapted to rest at its opposite ends on the knees of the attendant and means for detachably securing a pail to said bar consisting of pins or projections arranged on the bar and adapted to engage with one side of the pail and clamping levers pivoted on the bar and adapted to bear against the opposite side of the pail.

Witness our hands this 26 day of April, 1909.

GEORGE A. FITCH.
GUY A. CHAMBERLIN.

Witnesses:
CECIL WARREN,
J. MILTON JUNKER.